United States Patent
Hay

[19]

[11] Patent Number: 5,945,665
[45] Date of Patent: Aug. 31, 1999

[54] BOLT, STUD OR FASTENER HAVING AN EMBEDDED FIBER OPTIC BRAGG GRATING SENSOR FOR SENSING TENSIONING STRAIN

[75] Inventor: Arthur D. Hay, Cheshire, Conn.

[73] Assignee: CiDra Corporation, Wallingford, Conn.

[21] Appl. No.: 08/853,535

[22] Filed: May 9, 1997

[51] Int. Cl.[6] ............................ G01B 9/00; G01B 11/16; H01J 5/00
[52] U.S. Cl. ................................ 250/227.14; 250/227.18; 250/227.19; 250/227.23; 385/12; 356/345; 73/800
[58] Field of Search ........................ 250/227.14, 227.15, 250/227.16, 227.17, 227.18, 227.21, 227.23, 227.27, 231.1, 231.19; 356/35.5, 345; 385/12, 13, 37; 73/800, 761, 768, 796

[56] References Cited

U.S. PATENT DOCUMENTS

| | | |
|---|---|---|
| 4,761,073 | 8/1988 | Meltz et al. . |
| 4,806,012 | 2/1989 | Meltz et al. . |
| 4,950,883 | 8/1990 | Glenn . |
| 4,996,419 | 2/1991 | Morey . |
| 5,308,973 | 5/1994 | Odoni et al. . |
| 5,339,696 | 8/1994 | Carignan . |
| 5,361,130 | 11/1994 | Kersey et al. . |
| 5,401,956 | 3/1995 | Dunphy et al. . |
| 5,426,297 | 6/1995 | Dunphy et al. . |
| 5,444,803 | 8/1995 | Kim et al. . |
| 5,451,772 | 9/1995 | Narendran . |
| 5,452,087 | 9/1995 | Taylor et al. . |
| 5,493,113 | 2/1996 | Dunphy et al. . |
| 5,493,390 | 2/1996 | Varasi et al. . |
| 5,495,892 | 3/1996 | Carisella . |
| 5,507,341 | 4/1996 | Eslinger et al. . |
| 5,513,913 | 5/1996 | Ball et al. . |
| 5,529,346 | 6/1996 | Sperring . |
| 5,564,504 | 10/1996 | Carisella . |
| 5,564,832 | 10/1996 | Ball et al. ................ 250/227.14 |
| 5,723,857 | 3/1998 | Underwood et al. ............. 250/227.14 |

*Primary Examiner*—Edward P. Westin
*Assistant Examiner*—John R Lee
*Attorney, Agent, or Firm*—Ware, Fressola, Van Der Sluys & Adolphson LLP

[57] ABSTRACT

The present invention features an apparatus that provides an indication of tensioning strain when it is tensioned with respect to a workpiece, comprising either a bolt, stud or fastener together with an embedded fiber optic Bragg Grating sensor. For example, the bolt has a head at one end, threads at the other end and a central bore with a bore wall drilled into at least one end thereof. The bolt responds to a tensioning force applied on the head of the bolt, for providing a tensioning strain force applied inwardly on the wall of the central bore. The fiber optic Bragg Grating sensor is arranged inside the central bore of the bolt and bonded, for example by epoxy, to the central bore wall. The fiber optic Bragg Grating sensor responds to the tensioning strain force, and further responds to a light signal, for providing a fiber optic Bragg Grating sensor light signal containing information about a sensed tensioning strain force on the bolt when the threads are tensioned to the workpiece.

20 Claims, 8 Drawing Sheets

(BOLT W/ EXTERNAL CONNECTOR)

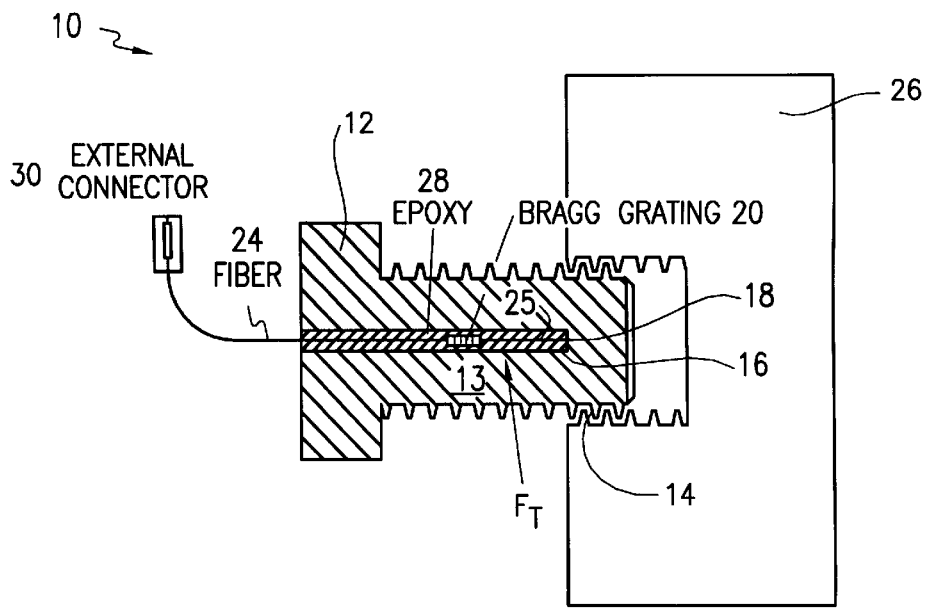
FIG. 1 (BOLT W/ EXTERNAL CONNECTOR)
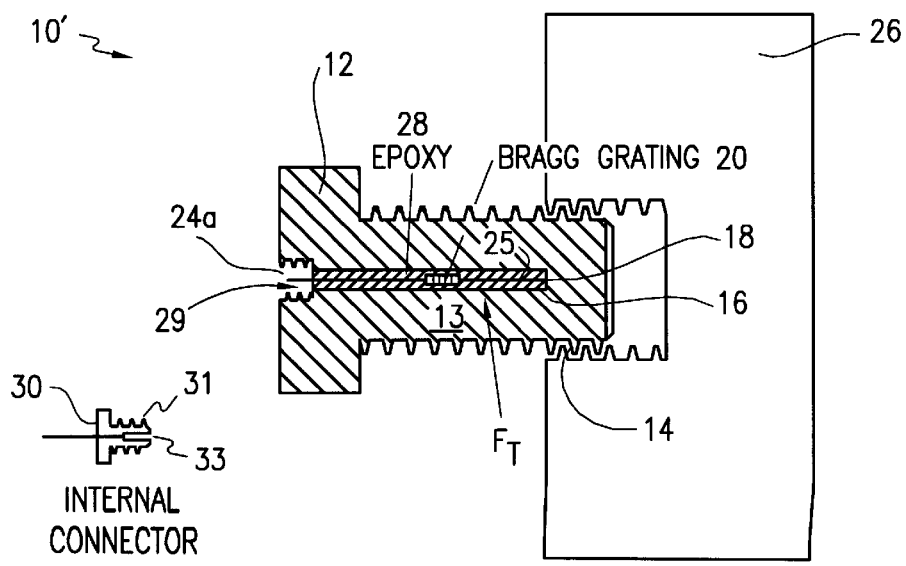
FIG. 1A (BOLT FOR FITTING AN INTERNAL CONNECTOR)

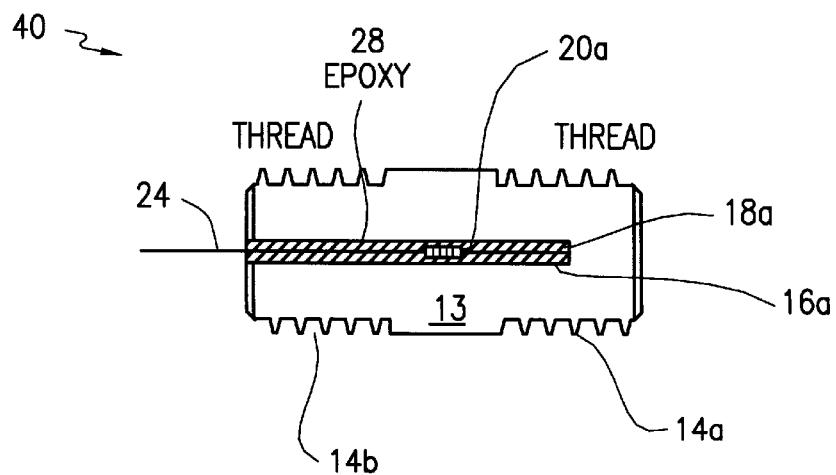
FIG. 2 (STUD FOR FITTING AN EXTERNAL CONNECTOR)
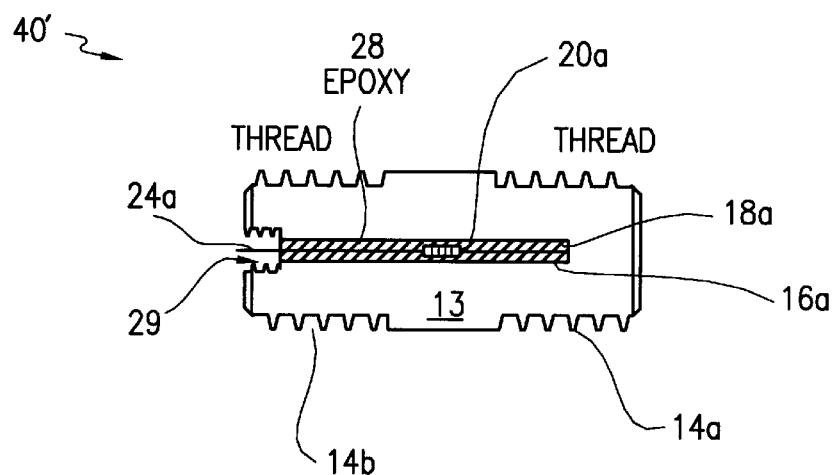
FIG. 2A (STUD FOR FITTING AN INTERNAL CONNECTOR)

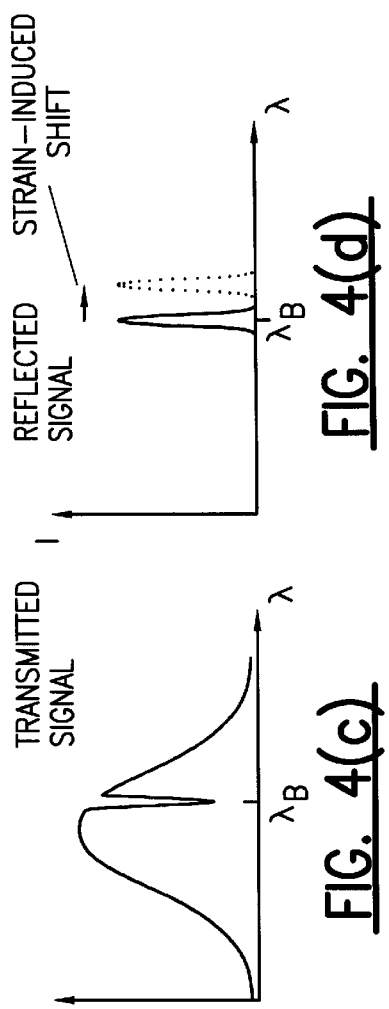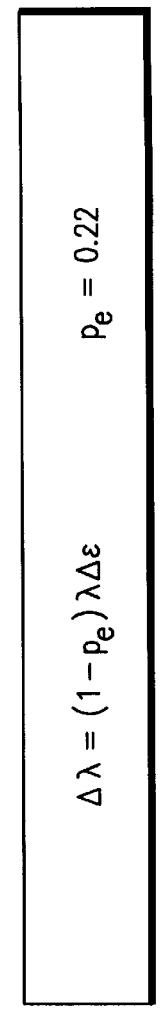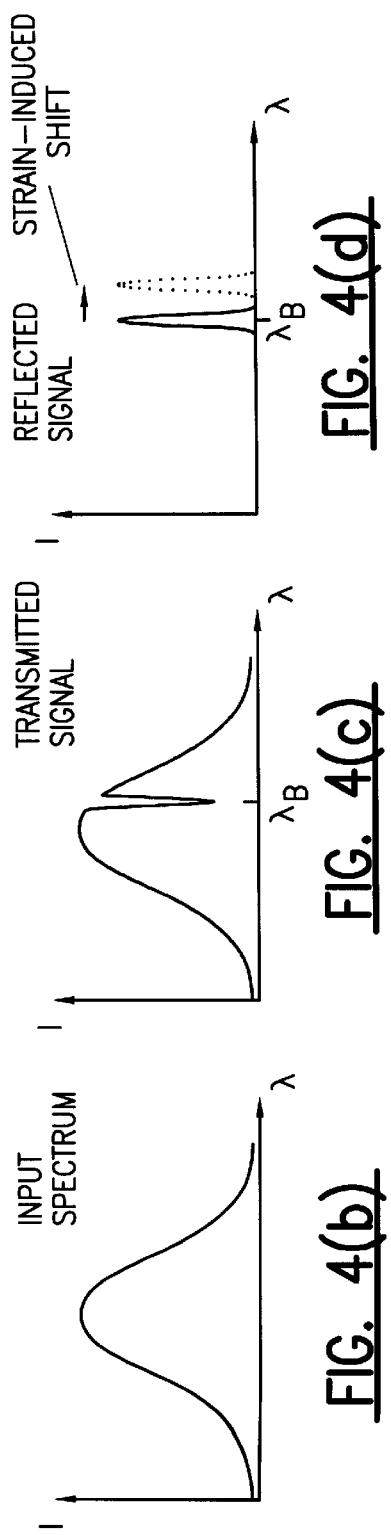
FIG. 4

WAVELENGTH DIVISION MULTIPLEXING
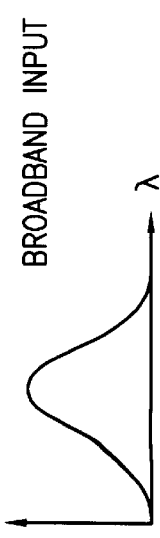
FIG. 5(b)
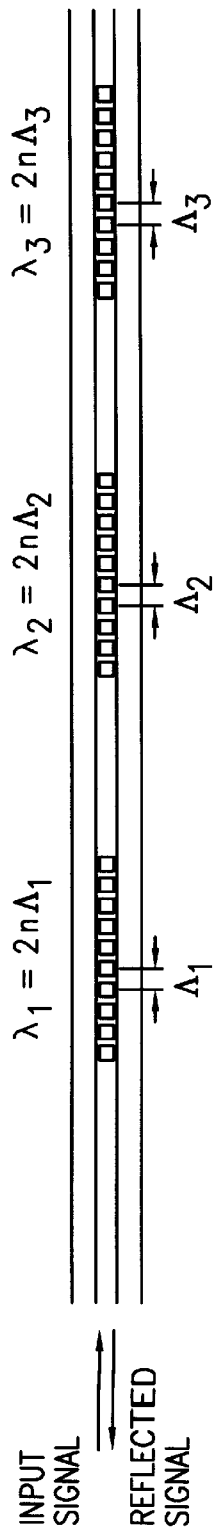
FIG. 5(a)
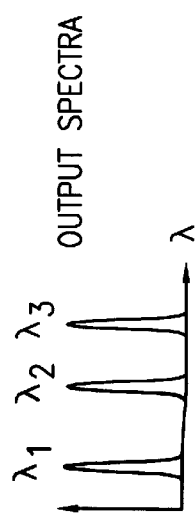
FIG. 5(c)
FIG. 5

BOLT, STUD OR FASTENER HAVING AN EMBEDDED FIBER OPTIC BRAGG GRATING SENSOR FOR SENSING TENSIONING STRAIN

TECHNICAL FIELD

The present invention relates to a bolt, stud or fastener; and more particularly, to a bolt, stud or fastener that senses tensioning strain applied thereto.

BACKGROUND OF INVENTION

During the course of assembly of relative parts it is often necessary to ensure that the interface loading is at a specific stress level. One of the current methods to achieve this is to use bolts or studs with nuts and washers, torqued to a predetermined level in order to impose the necessary loading. This method assumes that the torque imparted via calibrated torque wrenches or similar devices will impart loading to the respective interface to achieve the calculated stress levels. This method is quick and universally accepted, but the resultant loading is very dependent upon the thread profile and the coefficient of friction between the shank and the nut, as well as the interface coefficient of friction between the nut and the part being loaded.

A variety of apparatus exists to impart loading into a nut and bolt or stud and nut connector system, but all of them require torque to be imparted to the nut. With the slight variations of profile and surface finish the actual loading that is imparted axially to the bolt or stud varies from bolt to bolt even though a calibrated torque wrench or strain gauge loading device is used to impart the torque. This is recognized throughout the industry, and a number of techniques have been developed to measure the elongation of the bolt or stud. Such techniques use direct axial change in length measurement criteria to determine the strain in the bolt or stud. Such measurement apparatus ranges from the use of dial indicator gauges, ultra sonic measurement, angular measurement, and interferometer techniques. All such methods require the attachment of external devices or pre/post stress measuring techniques, which take time and are in themselves subject to error.

SUMMARY OF INVENTION

The present invention has the object of providing a highly accurate technique for determining tensioning strain when a bolt, stud or fastener is tensioned with respect to a workpiece.

The present invention features an apparatus that provides an indication of tensioning strain when it is tensioned with respect to a workpiece. The apparatus comprises either a bolt, stud or fastener together with an embedded fiber optic Bragg Grating sensor.

For example, the bolt has a head at one end, threads at the other end and a central bore with a bore wall drilled into at least one end thereof. The bolt responds to a tensioning force applied on the head of the bolt, for providing a tensioning strain force applied inwardly on the wall of the central bore.

The fiber optic Bragg Grating sensor is arranged inside the central bore of the bolt and bonded, for example by epoxy, to the bore wall. The fiber optic Bragg Grating sensor responds to the tensioning strain force, and further responds to a light signal, for providing a fiber optic Bragg Grating sensor light signal containing information about a sensed tensioning strain force when the bolt is tensioned with respect to the workpiece.

The fiber optic Bragg Grating sensor may include either a Bragg Grating point sensor, multiple Bragg Gratings, or a lasing element formed with pairs of multiple Bragg Gratings.

The foregoing and other objects, features and advantages of the present invention will become more apparent in light of the following detailed description of exemplary embodiments thereof, as illustrated in the accompanying drawings.

BRIEF DESCRIPTION OF THE DRAWINGS

FIG. 1 is a diagram of one embodiment of a bolt which is the subject matter of the present invention.

FIG. 1A is a diagram of another embodiment of a bolt which is the subject matter of the present invention.

FIG. 2 is a diagram of one embodiment of a stud which is the subject matter of the present invention.

FIG. 2A is a diagram of another embodiment of a stud which is the subject matter of the present invention.

FIG. 4 includes FIGS. 4(*a*), 4(*b*), 4(*c*), 4(*d*) and 4(*e*).

FIG. 4(*a*) is an illustration of a photoimprinted Bragg Grating sensor.

FIG. 4(*b*) is a graph of a typical spectrum of an input signal to the photoimprinted Bragg Grating sensor in FIG. 4(*a*).

FIG. 4(*c*) is a graph of a typical spectrum of a transmitted signal from the photoimprinted Bragg Grating sensor in FIG. 4(*a*).

FIG. 4(*d*) is a graph of a typical spectrum of a reflected signal from the photoimprinted Bragg Grating sensor in FIG. 4(*a*).

FIG. 4(*e*) is an equation for the change of wavelength.

FIG. 5 includes FIGS. 5(*a*), (*b*) and (*c*) relating to wavelength division multiplexing of three Bragg Grating sensors.

FIG. 5(*a*) is an illustration of three Bragg Grating sensors.

FIG. 5(*b*) is a graph of a typical spectrum of broadband input spectrum to the photoimprinted Bragg Grating sensor in FIG. 5(*a*).

FIG. 5(*c*) is a graph of an output spectrum of a reflected signal from the three photoimprinted Bragg Grating sensor in FIG. 5(*a*).

FIG. 7(*a*) shows interferometric decoding of a Bragg Grating sensor.

FIG. 7(*b*) is a graph of output spectra of a wavelength encoded return signal from the Bragg Grating sensor in FIG. 7(*a*).

FIG. 7(*c*) is an equation for determining a wavelength shift transposed to a phase shift via interferometric processing of the wavelength encoded reflected signal shown in FIG. 7(*b*).

DETAILED DESCRIPTION OF THE INVENTION

Figure 3:
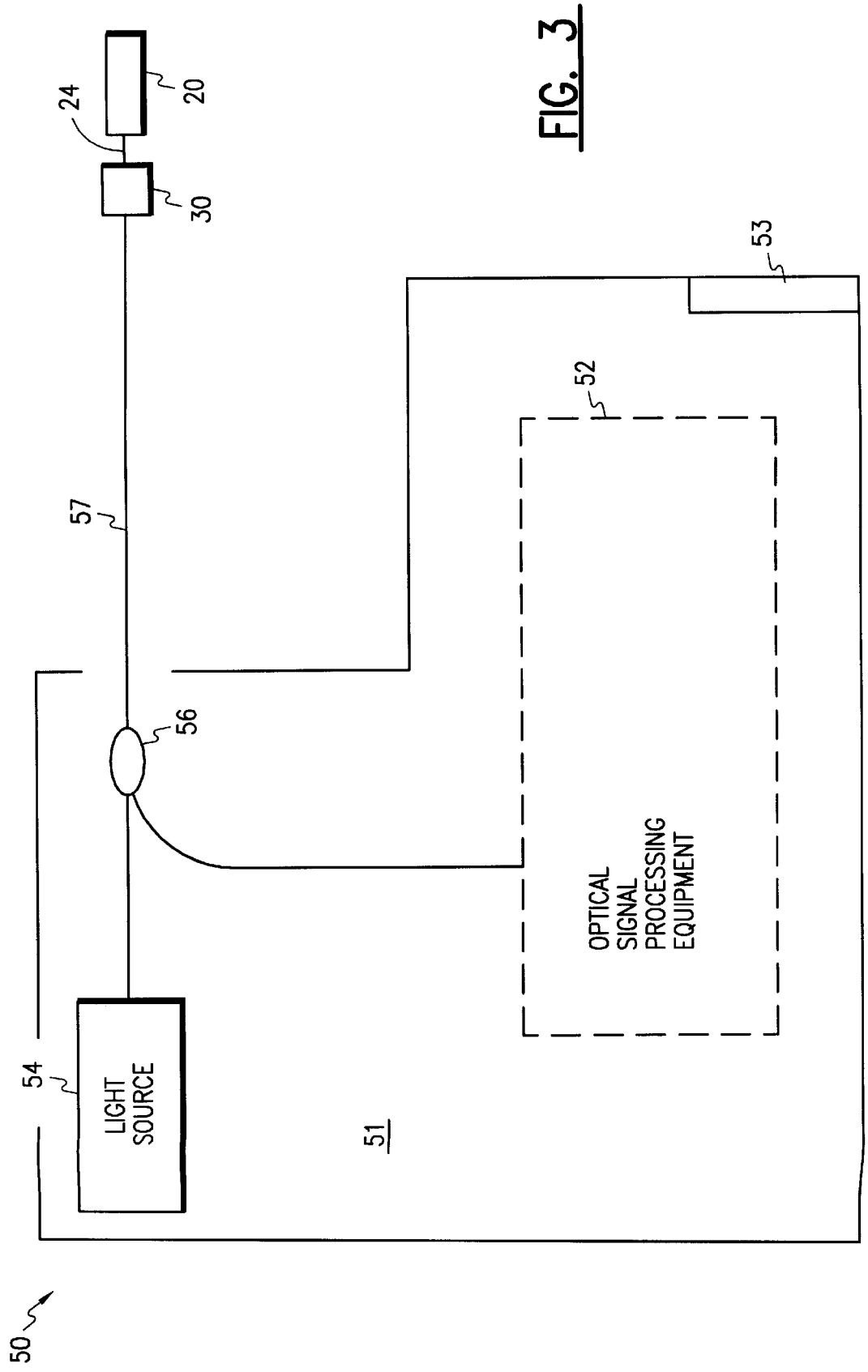
FIG. 3 is a diagram of the signal processing circuitry that can be used with the present invention.
Figure 6:
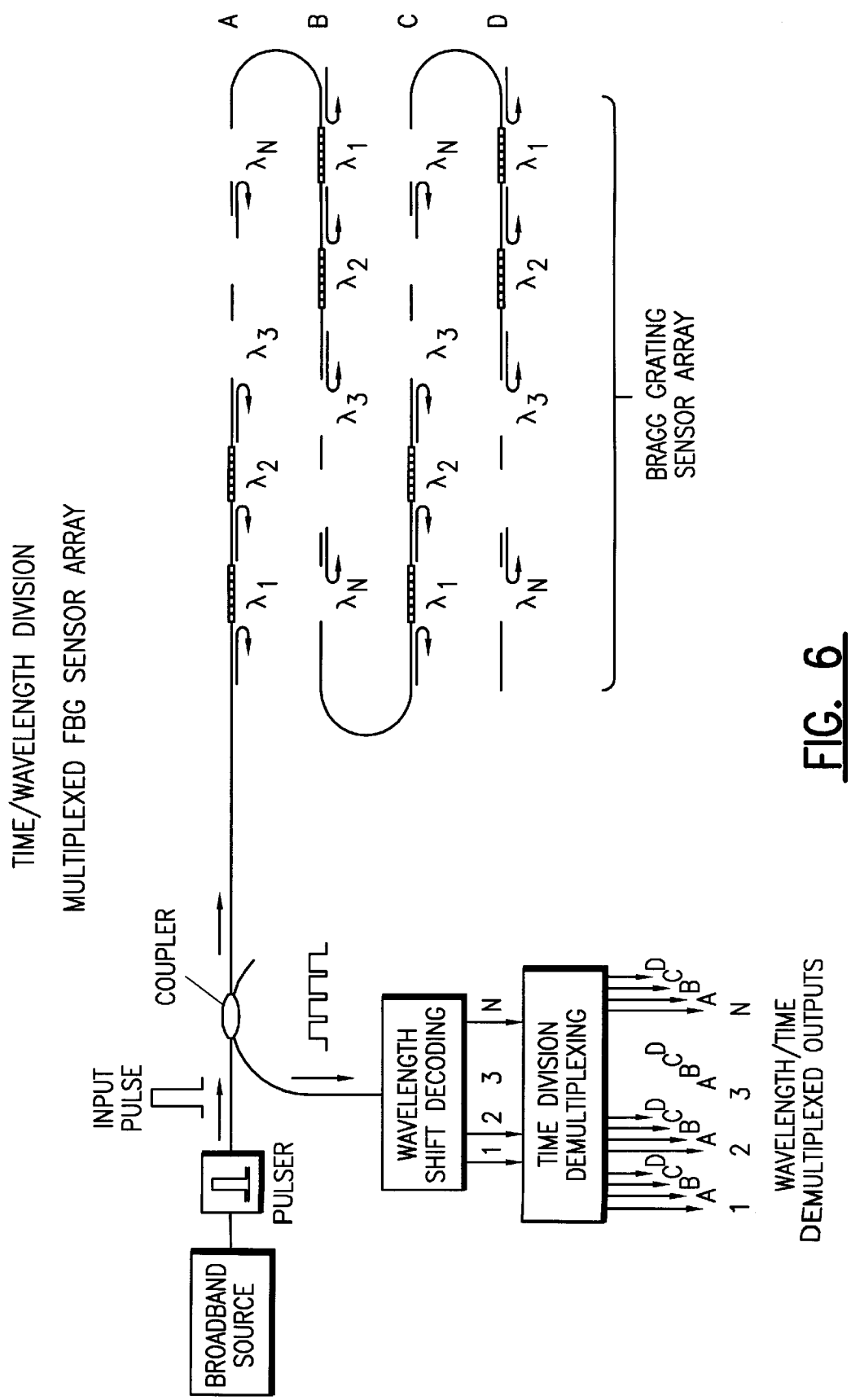
FIG. 6 is a time/wavelength division multiplexed Bragg Grating sensor array.
Figure 7:
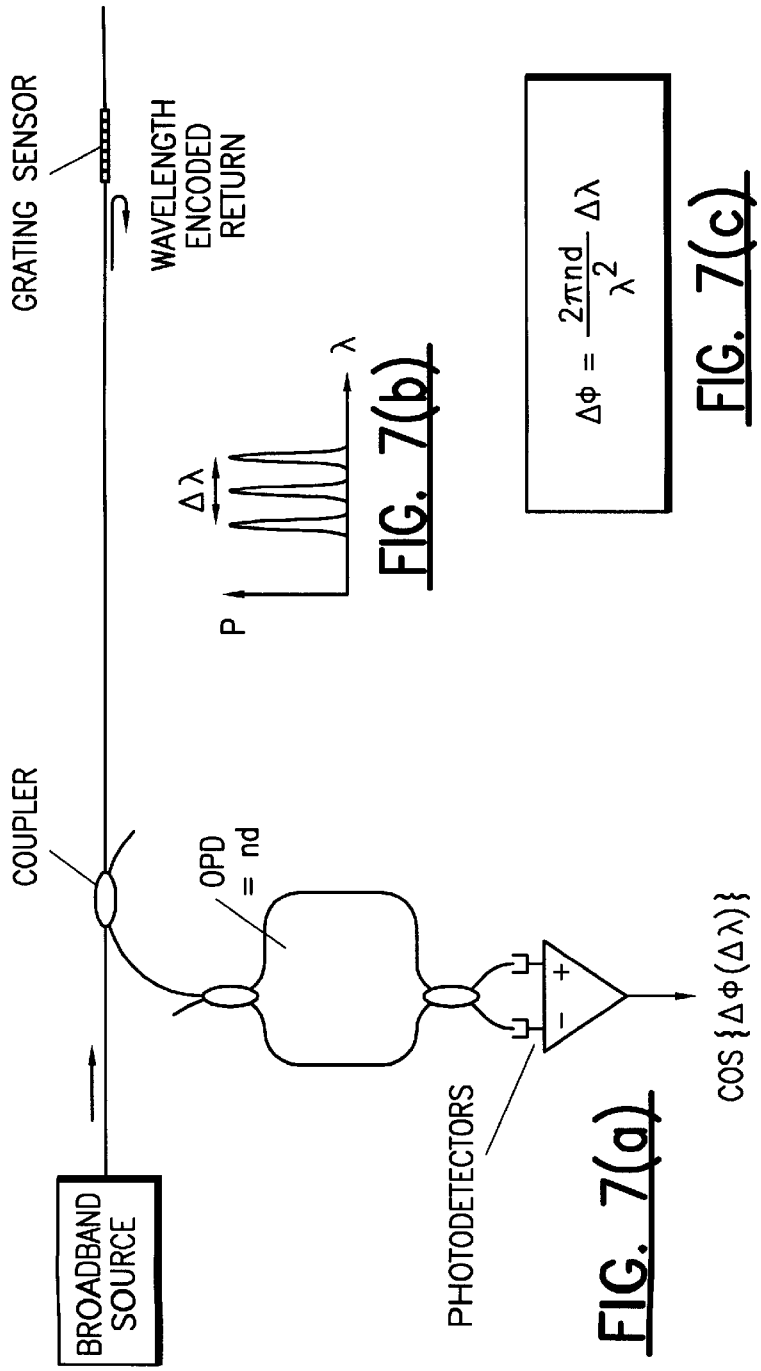
FIG. 7 includes FIGS. 7(*a*), (*b*) and (*c*).
Figure 8:
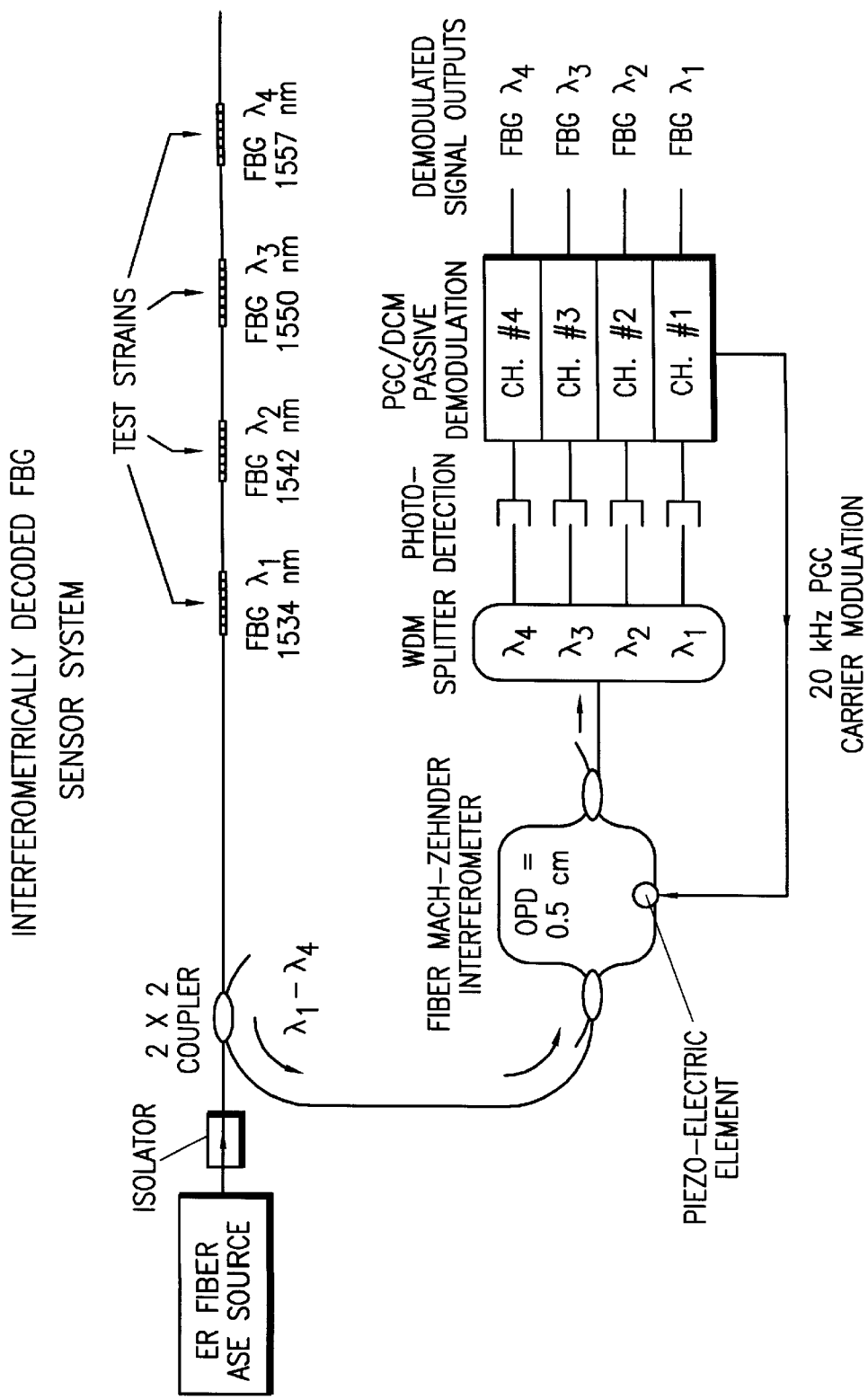
FIG. 8 shows an interferometrically decoded Bragg Grating sensor system.

Referring now to FIGS. 1 and 1A, the bolt generally indicated as 10 and 10' has a head 12 at one end, a shank 13 having threads 14 at the other end and a central bore 16 with a bore wall 18 drilled into at least one end thereof. The bolt 10 responds to a tensioning force applied on the head 12 thereof, for example by a wrench, etc., for providing a tensioning strain force $F_T$ applied inwardly on the bore wall of the central bore.

A stud generally indicated as 40 and 40' is shown in FIGS. 2 and 2A. For the convenience of the reader, in FIGS. 1, 1A, 2, 2A elements that substantially correspond to one another have similar reference labels.

A fiber optic Bragg Grating sensor generally indicated as 20 is arranged inside the central bore 16 of the bolt 10 and bonded, for example by epoxy 22, to the bore wall 18. The fiber optic Bragg Grating sensor 20 responds to the tensioning strain force $F_T$, and further responds to a light signal from a fiber 24, for providing a fiber optic Bragg Grating sensor light signal containing information about a sensed tensioning strain force when the bolt 10 is tensioned with respect to a workpiece 26.

In effect, the invention permanently inserts the Fiber Optic Bragg Grating sensor 20 into the bolt 10 or stud 40 (FIG. 2) to be torqued, such that the Fiber Optic Bragg Grating sensor 20 is located centrally within the shank 13, and is secured therein by a bonding material such as an epoxy 28 so that the Fiber Optic Bragg Grating sensor 20 is bonded directly to the bolt or stud material and moves in full compliance with the same. Any strain which is therefore induced into the shank 13 of the bolt 10 or stud 40 (FIG. 2) is also induced into the Fiber Optic Bragg Grating sensor 20. Such strain is manifested by a change in the index of refraction of the Fiber Optic Bragg Grating sensor 20 to light at a specific wavelength. Then by using standard interferometric decoding techniques, discussed in more detail below, the wavelength shift can be changed to a phase shift and hence strain.

Due to the small size of the optical fiber 24 (125 to 500 microns) and the fact that it is inserted into the center of the shank 13, the strength of the shank 13 is not compromised.

The fiber 24 can be installed such that it extends from the shank 13 of the bolt 10 or stud 40 (FIGS. 2, 2A) so that it can be coupled to optical decoding equipment, or it can be (depending upon the diameter of the bolt or stud) terminated within the shank 13 of the bolt 10 or stud 40 with a fiber optic interconnect generally indicated as 30 and shown in FIG. 1. In FIGS. 1A and 2A, the bolt 10' or stud 40' have means generally indicated as 29 for receiving an integral plugable remakeable connector 30'. As shown in FIGS. 1A, 2A, the means 29 is a threaded cavity in the head of the bolt 10' or stud 40' for coupling to the integral plugable remakeable connector 30' which has corresponding threads 31 and a slot generally indicated as 33 for receiving a fiber flylead 24a.

As discussed in detail below, a direct strain readout box generally indicated as 51 in FIG. 3 with a broadband or laser light source, and photodector measuring equipment is required to decode the wavelength shift and display the results as direct strain, bolt loading, or interface pressure, depending upon the specific application. The direct strain readout box 51 is equipped with a fiber optic lead which couples directly the fiber 24 protruding from the bolt 10, stud 40 or fastener or plug directly into the connector 30. The direct strain readout box 51 can have multiple leads for set-ups whereby there is more than one fastener to be torqued. Internal optical switching 53 in the direct strain readout box 51 allows each fiber cable to be monitored in any sequence.

The Optic Fiber Bragg Grating Sensor 20 The invention is described as using fiber Bragg gratings as sensors, which are known in the art. The Bragg gratings may be a point sensor, and it should be understood that any suitable Bragg grating sensor configuration may be used. For example, the Bragg gratings can be used with interferometric detection. Alternatively, the Bragg gratings may be used to form lazing elements for detection, for example by positioning an Ebrium doped length of optical fiber between a pair of Bragg gratings. It will also be understood by those skilled in the art that the present invention will work equally as well with other types of Bragg Grating sensors. The benefits of the present invention are realized due to improved sensitivity of transmission of force fluctuations to the sensors via the high density, low compressibility material.

In FIG. 1, the distal end 25 of fiber 24 is terminated in an anti-reflective manner, so as to prevent interference with the reflected wavelengths from the Optic Fiber Bragg Gratings Sensor 20. For example, the distal end 25 of the fiber 24 may be cleaved at an angle so that the end face is not perpendicular to the fiber axis. Alternatively, the distal end 25 of the fiber 24 may be coated with a material that matches the index of refraction of the fiber, thus permitting light to exit the fiber without back reflection, and be subsequently disbursed in the index-matching material.

The Signal Processing Circuit

A person skilled in the art would appreciate how the optic fiber Bragg Grating sensor 20 is used as a sensor element. By way of a brief description, when such a fiber grating is illuminated, it reflects a narrow band of light at a specified wavelength. However, a measurand, such as strain induced by pressure or temperature, will induce a change in the fiber grating spacing, which changes the wavelength of the light it reflects. The value (magnitude) of the measurand is directly related to the wavelength reflected by the fiber grating and can be determined by detecting the wavelength of the reflected light.

Referring now to FIG. 3, an example of signal processing circuitry is shown and generally indicated as 50 that may be used in conjunction with the present invention. The direct strain readout box generally indicated as 51 includes an optical signal processing equipment 52, a broadband source of light 54, such as the light emitting diode (LED), and appropriate equipment such as a coupler 56, a fiber lead 57 and the external connector 30 for delivery of signal light to the Bragg grating sensor 20 (FIG. 1) included within the core of the optical fiber 24. The broadband source of light 54 provides an optical signal to the Bragg gratings 20, where it is reflected and returned to the direct strain readout box 51 as a return light signal. The optical coupler 56 provides the return light signal to the optical signal processing equipment 52 for analysis. The scope of the invention is not intended to be limited to any specific embodiment of the optical signal processing equipment 52. Other optical signal analysis techniques may be used with the present invention such as the necessary hardware and software to implement the optical signal diagnostic equipment disclosed in U.S. Pat. Nos. 4,996,419; 5,361,130; 5,401,956; 5,426,297; and/or 5,493,390, all of which are hereby incorporated by reference.

As is well known in the art, there are various optical signal analysis approaches which may be utilized to analyze return signals from Bragg gratings. These approaches may be generally classified in the following four categories:

1. Direct spectroscopy utilizing conventional dispersive elements such as line gratings, prisms, etc., and a linear array of photo detector elements or a CCD array.

2. Passive optical filtering using both optics or a fiber device with wavelength-dependent transfer function, such as a WDM coupler.

3. Tracking using a tuneable filter such as, for example, a scanning Fabry-Perot filter, an acousto-optic filter such as the filter described in the above referenced U.S. Pat. No. 5,493,390, or fiber Bragg grating based filters.

4. Interferometric detection.

The particular technique utilized will vary, and will depend on the Bragg wavelength shift magnitude (which depends on the sensor design) and the frequency range of the measurand to be detected. The reader is generally referred to FIGS. 4–8, which would be appreciated by a person skilled in the art.

Temperature Compensation

Due to various non-linear effects associated with materials, construction, etc., and to geometrical, tolerance, and other variations which occur during manufacturing and assembly, linear temperature compensation alone may not be sufficient to produce a linear sensor. Therefore the device may be further characterized over temperature, allowing a correction of output for temperature by means of curve fitting, look-up table, or other suitable means.

As will be further understood by those skilled in the art, the optical signal processing equipment may operate on a principle of wave-division multiplexing as described above wherein each Bragg grating sensor is utilized at a different passband or frequency band of interest. Alternatively, the present invention may utilize time-division multiplexing for obtaining signals from multiple independent sensors, or any other suitable means for analyzing signals returned from a plurality of Bragg grating sensors formed in a fiber optic sensor string.

General Operation of Invention

In general, when properly sized the installation of the Fiber Optic Bragg grating sensor 20 and the fiber 24 into the bolt 10 or stud 40 (FIG. 2) in no way alters or compromises conventional bolt 10 or stud 40 installation techniques, or subsequent torquing methods. The bolt 10 or stud 40 are installed together with the respective securing devices (nut) and mating part or parts, in the sequence necessary to assemble and establish principle contact between mating parts, but no actual torque should be applied until the readout box 51 is coupled to the optical fiber within the bolt 10 or stud 40 (FIG. 2).

The bolt 10 or stud 40 must then be tightened (sequentially via diagonally opposite fasteners, or per design instructions if more than one) to the point where strain begins to register. If only one bolt 10 or stud 40 has to be torqued, then torquing should continue until the calculated strain or loading is recorded. If several bolts 10 or studs 40 require to be torqued then they should be torqued up in the recommended sequence to 95% of full strain until all fasteners are at the same strain value, then in the recommended sequence they should be torqued until each is at the recommended design strain. The readout box 51 must be coordinated with the bolt 10 or stud 40 being tightened.

The present invention has applications for all fasteners used with a shank, as well as those that are used to hold two or more parts in a fixed position relative to each other. Although the invention has been described and illustrated with respect to exemplary embodiments thereof, the foregoing and various other additions and omissions may be made therein and thereto without departing from the spirit and scope of the present invention.

I claim:

1. An apparatus that provides an indication of tensioning strain when tensioned with respect to a workpiece, comprising:
   a tensioning means having a central bore therein, responsive to a tensioning force, for providing a tensioning strain radial compression force; and
   a tensioning strain force sensing means having a fiber optic Bragg Grating sensor arranged inside the central bore and bonded by epoxy to the material of the tensioning means, the tensioning strain force sensing means being responsive to the tensioning strain radial compression force, and further responsive to a light signal, for providing a tensioning strain radial compression force light signal in the form of a fiber optic Bragg Grating sensor light signal containing information about a sensed tensioning strain radial compression force on the tensioning means when the apparatus is tensioned to the workpiece.

2. An apparatus according to claim 1, wherein the tensioning means is a bolt having a bolt head and threads.

3. An apparatus according to claim 1, wherein the tensioning means is a stud having threads on each end.

4. An apparatus according to claim 1, wherein the fiber optic Bragg Grating sensor includes either a Bragg Grating point sensor, multiple Bragg Gratings, or a lasing element formed with pairs of multiple Bragg Gratings.

5. An apparatus according to claim 1, wherein the apparatus includes optical signal processing equipment using an interferometric decoding technique for changing a wavelength shift in the tensioning strain force light signal to a phase shift for determining the tensioning strain force on the tensioning means.

6. An apparatus according to claim 1, wherein the apparatus includes a direct strain readout box with a broadband or laser light source, and photodector measuring equipment to decode wavelength shifts and display the tensioning strain force applied on the tensioning means.

7. An apparatus according to claim 6, wherein the direct strain readout box has a fiber optic lead which couples directly a fiber protruding from the tensioning means, or into a fiber optic connector installed in a shank of the tensioning means.

8. An apparatus according to claim 6, wherein the direct strain readout box has multiple leads for set-ups for displaying tensioning strain forces on a multiplicity or tensioning means.

9. An apparatus according to claim 6, wherein the apparatus includes an internal optical switching for allowing multiple tensioning means to be monitored in any sequence.

10. An apparatus according to claim 6, wherein the tensioning force is a torque applied to a head of the tensioning means.

11. An apparatus that provides an indication of tensioning strain when tensioned with respect to a workpiece, comprising:
   a tensioning means, responsive to a tensioning force, for providing a tensioning strain radial compression force;
   a tensioning strain force sensing means having a fiber optic Bragg Grating sensor being terminated within a shank of the tensioning means with a fiber optic interconnect, the tensioning strain force sensing means being responsive to the tensioning strain radial compression force, and further responds to a light signal, for providing a tensioning strain radial compression force light signal in the form of a fiber optic Bragg Grating sensor light signal containing information about a sensed tensioning strain radial compression force on the tensioning means when the apparatus is tensioned to the workpiece.

12. An apparatus for providing an indication of tensioning strain when tensioned with respect to a workpiece, comprising:

a bolt having a head at one end, threads at the other end and a central bore with a central bore wall drilled into at least one end, and being responsive to a tensioning force applied on the head of the bolt, for providing a tensioning strain force applied inwardly on the wall of the central bore; and a fiber optic Bragg Grating sensor arranged inside the central bore of the bolt and bonded by an epoxy to the central bore wall, and being responsive to the tensioning strain force, and further responsive to a light signal, for providing a fiber optic Bragg Grating sensor light signal containing information about a sensed tensioning strain force on the bolt when the threads are tensioned to the workpiece.

13. An apparatus according to claim 12, wherein the central bore terminates within the bolt.

14. An apparatus according to claim 12, wherein the fiber optic Bragg Grating sensor includes either a Bragg Grating point sensor, multiple Bragg Gratings, or a lasing element formed with pairs of multiple Bragg Gratings.

15. An apparatus for providing an indication of tensioning strain when tensioned with respect to a workpiece, comprising:

a stud having threads at both ends and a central bore with a central bore wall drilled into at least one end, and being responsive to a tensioning force applied on at least one of the threads of the stud, for providing a tensioning strain force applied inwardly on the wall of the central bore; and a fiber optic Bragg Grating sensor arranged inside the central bore of the stud and bonded by an epoxy to the central bore wall, and being responsive to the tensioning strain force, and further responsive to a light signal, for providing a fiber optic Bragg Grating sensor light signal containing information about a sensed tensioning strain force on the stud when the apparatus is tensioned to the workpiece.

16. An apparatus according to claim 15, wherein the central bore terminates within the bolt.

17. An apparatus according to claim 15, wherein the fiber optic Bragg Grating sensor includes either a Bragg Grating point sensor, multiple Bragg Gratings, or a lasing element formed with pairs of multiple Bragg Gratings.

18. An apparatus for providing an indication of tensioning strain when tensioned with respect to a workpiece, comprising:

a tensioning means, responsive to a tensioning force, for providing a tensioning strain radial compression force; and fiber optic Bragg Grating sensor means embedded in the tensioning means, and being responsive to the tensioning strain radial compression force, and further responds to a light signal, for providing a fiber optic Bragg Grating sensor light signal containing information about a sensed tensioning strain radial compression force when the apparatus is tensioned to the workpiece.

19. An apparatus according to claim 18, wherein the tensioning means is either a bolt, stud or fastener.

20. An apparatus according to claim 18, wherein the fiber optic Bragg Grating sensor includes either a Bragg Grating point sensor, multiple Bragg Gratings, or a lasing element formed with pairs of multiple Bragg Gratings.

* * * * *

UNITED STATES PATENT AND TRADEMARK OFFICE
CERTIFICATE OF CORRECTION

PATENT NO. : 5,945,665
DATED : August 31, 1999
INVENTOR(S) : Hay

It is certified that error appears in the above-identified patent and that said Letters Patent is hereby corrected as shown below:

At column 3, line 66, the heading reads "The Optic Fiber Bragg Grating Sensor 20", and "The invention" should begin a new paragraph and be moved to line 67

At column 6, line 46, delete "or tensioning means" and insert --of tensioning means--.

Signed and Sealed this

Twentieth Day of June, 2000

Attest:

Q. TODD DICKINSON

*Attesting Officer*  *Director of Patents and Trademarks*